INVENTOR.
CARLE C. CONWAY, III

BY D. Gordon Angus
ATTORNEY

Sept. 19, 1961  C. C. CONWAY III  3,000,360
HYDRAULIC VALVE

Filed April 15, 1957  3 Sheets-Sheet 3

INVENTOR.
CARLE C. CONWAY, III

BY
D. Gordon Angus
ATTORNEY

United States Patent Office 3,000,360
Patented Sept. 19, 1961

3,000,360
HYDRAULIC VALVE
Carle C. Conway III, Glendora, Calif., assignor to Aerojet-General Corporation, Azusa, Calif., a corporation of Ohio
Filed Apr. 15, 1957, Ser. No. 652,937
6 Claims. (Cl. 121—41)

This invention relates to control mechanisms for apparatus supplying a pressure line, and specifically to a device for regulating flow of the medium driving a turbine-pump combination in response to variations from a giving pressure in the pressure line supplied by the turbine-pump combination, although the device is not necessarily restricted to the control of a turbine-pump combination.

While many mechanisms for the purpose of controlling hydraulic pumps are known, they are often subject to defects such as being bulky or complicated and subject to getting out of order, or lacking in sensitivity.

For some specific applications, it is highly desirable, if not essential, that the control device should be sensitive, fast in action, capable of exerting considerable force, occupy small space and be entirely reliable; it is the general object of the present invention to provide a control device which will meet these requirements.

It is an object of the invention to provide a self contained servo control mechanism which positions an output shaft in response to, and as a function of, an input pressure.

It is a further object of the invention to operate a valve controlling the flow of working medium to a turbine-pump combination as a function of the difference between the discharge pressure of the turbine-pump combination and of a selected level thereof.

It is a more specific object of the invention to provide a servo mechanism which can be set to operate at a predetermined pressure, respond to a temporary difference of pressure between the selected pressure and that in the pressure line, and operate in a sense determined by the difference in pressure to open or close a valve controlling the flow of working fluid to the turbine-pump combination to bring the output pressure back to the predetermined pressure.

With these and other objects in view, the invention comprises a servo mechanism having a line pressure sensing valve operated by fluid bypassed from the discharge line and an actuator arranged concentrically therewith, the actuator including a piston providing a magnified force to the actuator compared with the force exerted by the pressure of the line being sensed, which pressure acts in opposition to resilient means set to a predetermined value, to operate a valve controlling the flow of working fluid to the pump supplying the pressure line.

The term "servo" indicates a mechanism which senses error in a control parameter and produces corrective action based on the magnitude and direction of the error and is used in this specification to indicate such a mechanism exerting a greater output force than the force supplied to the mechanism.

Figure 1:
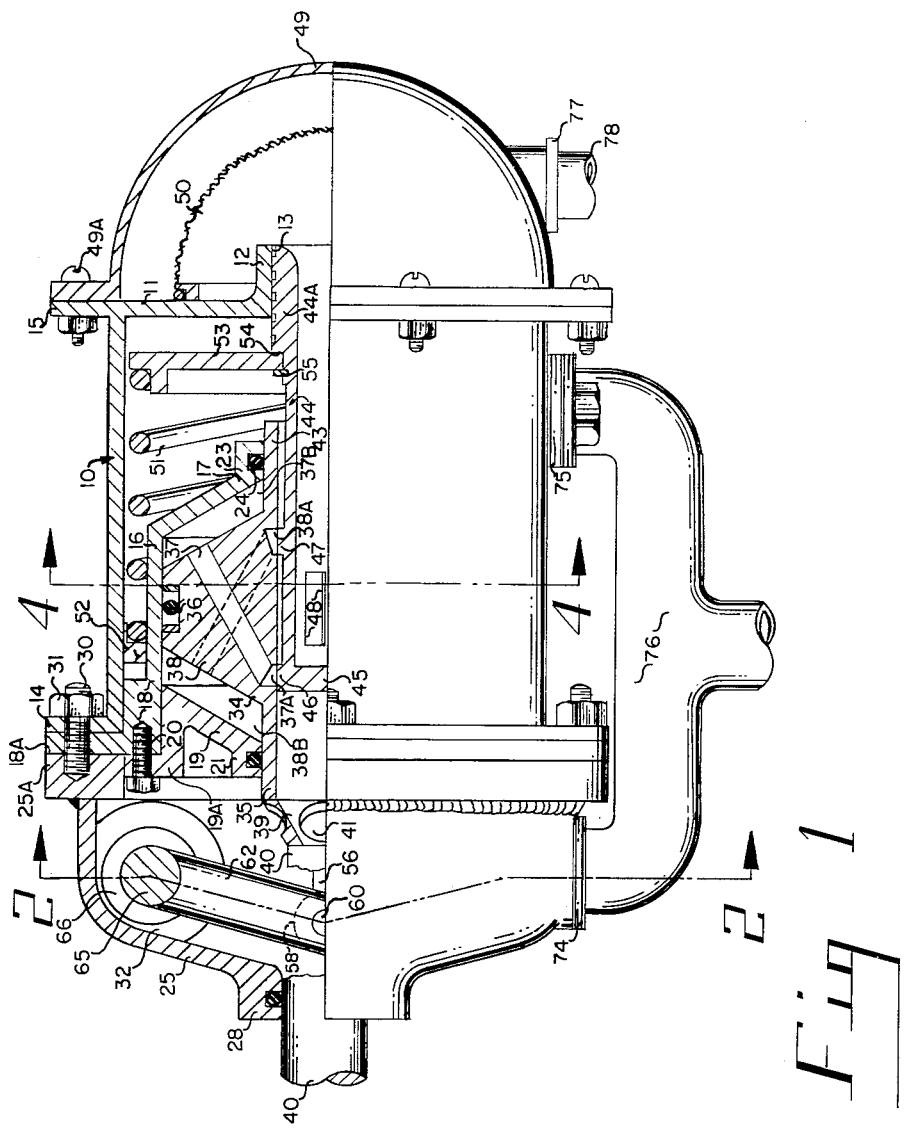
FIG. 1 is a side elevation partly in section along the longitudinal center line of a hydraulic servo control mechanism incorporating the features of this invention.
Figure 2:
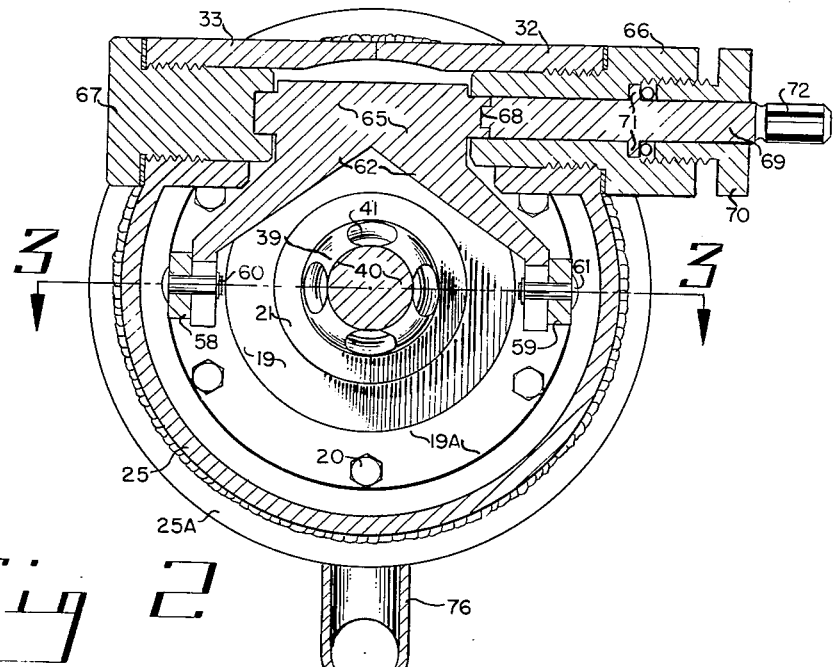
FIG. 2 is a section on the line 2—2 of FIG. 1.
Figure 3:
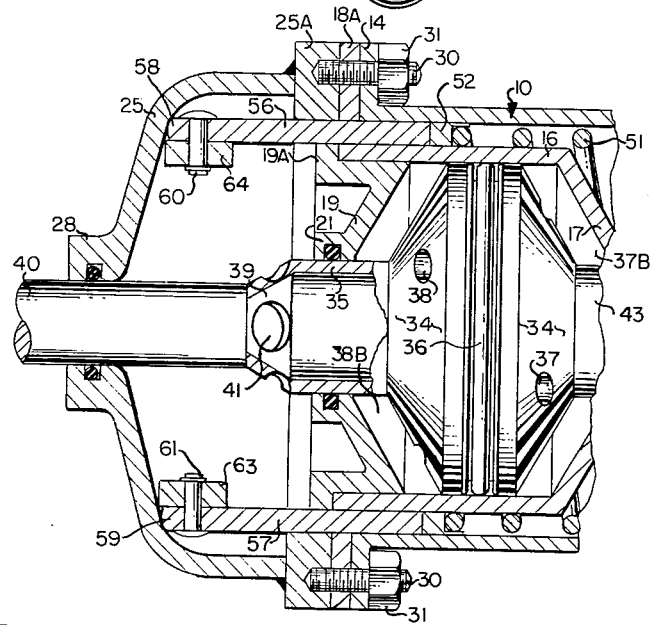
Figure 4:
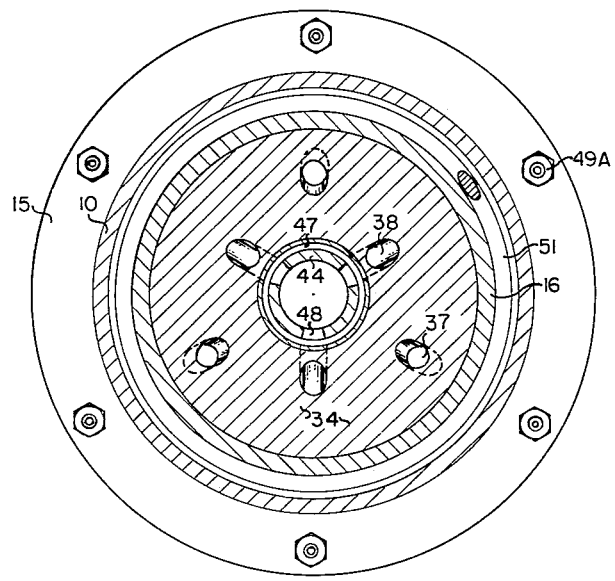

FIG. 3 is a cross section on the line 3—3 of FIG. 2, rotated 90 degrees from the cutting plane 3—3, which is an inner cylinder being shown unsectioned; and FIG. 4 is a cross section on the line 4—4 of FIG. 1.

The drawings show the device about twice its full size and in a neutral or minimum flow position during operation.

In FIG. 1 the numeral 10 indicates an outer cylindrical case open at one end and closed at the opposite end by a wall 11 provided with a central boss 12 which is machined to provide an accurately ground bearing 13. Case 10 is provided with annular flanges 14 and 15 which may be separate structures or an integral part of the case. A double ended cylinder generally indicated at 16 is formed with an inner end projecting into the case 10 and engaging therewith by relatively thick peripheral collar 18 and a flange 18a abutting flange 14. The outer end of cylinder 16 is closed by a head 19 fitting against the inner periphery of the outer end of cylinder 16, and having flange 19a secured to the end of peripheral collar 18 by studs 20. Head 19 is formed with a central bearing 21 provided with fluid retaining O ring packing positioned in a peripheral groove in the inner surface of bearing 21.

Inner end 17 is also provided with a bearing 23 and O ring packing 24. A fluid tight cover generally indicated at 25 is secured to the front of the assembly and is provided with a thick mounting flange 25a welded to the cover and with a central boss provided with a bearing 28 having an O ring seal arranged therein. Hold down studs 30 are secured in flanges 25a and extend through the aligned holes in flanges 14 and 18a, the flanges being clamped together by nuts 31 engaging on studs 30. The cover 25 is cast with aligned bosses 32 and 33 in which a control shaft 40 is mounted, as later described.

The elements producing an output displacement with amplified force bearing a direct relation to the difference between pressure being sensed and a selected reference pressure comprises an actuator and piston rod generally indicated by 34 mounted in cylinder 16. The piston is provided on its periphery with pressure seal 36 and may be secured on, or as shown, formed integrally with a motion transmitting member or actuator shaft generally indicated at 35. The member 35 is tubular for the portion of its length lying within cylinder 16. The piston is provided with passages 37 and 38 extending between the opposite working faces of the piston and peripheral grooves 37a and 38a in the inner surface of the tubular portion of the actuator, preferably, at least two of each said passages arranged diametrically opposite each other being provided. The working spaces between the piston and cylinder ends are indicated at 37b and 38b. The outer end 39 of the tubular portion of member 35 is mounted in bearing 21 and is integral with a rod extension 40 of smaller diameter extending forwardly of the bearing. Ports 41 are drilled to tubular portion for escape of fluid from the interior into the cover 25. The inner end 43 of the actuator 35 defines the outer wall of a passage for the escape fluid into case 10, as later explained.

A pressure sensing piston and control valve generally indicated at 44 is arranged to slide in the tubular portion of the actuator and passes through bearing 13 of the outer case 10 at its rear end 44a, fluid led into the space outside wall 11 is therefore prevented from entering case 10 except through member 44. The closed forward end 45 of member 44 acts as a pressure responsive piston and lands 46 and 47 are provided, spaced to simultaneously cover grooves 37a and 38a in the neutral position of the device. Ports 48 through the wall of member 44 supply fluid to the space between the lands. The only flow through the device when in the position in which the lands cover groove 37a and 38a is that due to leakage. Fluid is supplied to the interior of the piston 44 through an inlet housing 49 bolted to the rear of the device in which a strainer 50 may be fitted if required, although such a strainer is not required in a filtered hydraulic system. The inlet housing is shown secured by bolts 49a to flange 15. The pressure sensing piston system and valve 44 are preloaded by spring 51 arranged between the outer surface of cylinder 16 and inner surface of case 10, and bearing at its forward end against a pressure ring 52 riding on the outer surface of cylinder 16 and its opposite end against a retaining plate 53, positioned against a peripheral shoulder 54 on the rearward end 44a of member 44, retained in position by a spring retaining ring 55 engaging in an annular groove in the surface of portion 44a.

With reference now to FIGURE 3, adjustment of the preloading of spring 51 is effected by a pair of stems 56 and 57 bearing against pressure ring 52 at their rear ends, and guided in holes drilled through collar 18 and flange 19a. The forward ends of the stems project into the end cover 25 and are formed with heads 58 and 59 from which pins 60 and 61 project laterally for engagement by a forked lever 62 best shown in FIGURE 2 as having slotted ends 63 and 64. Lever 62 is shown as formed integrally with a short shaft 65 the ends of which are mounted in bearings provided in the inner ends of plugs 66 and 67 screwed into threaded bores in bosses 32 and 33. One end of the shaft 65 is slotted to receive a tongue 68 projecting from a short shaft 69 carried by plug 66 which is provided with an enlarged outer end which is counterbored to receive a retaining bearing nut 70 engaging against a collar 71 on shaft 69.

The outer end of shaft 69 is splined as indicated at 72 for the attachment of means (not shown) by which shaft 69 may be operated and held in adjusted position. Clockwise or counterclockwise rotation of the shaft 69 is transmitted through the lever 62, heads 58, 59, stems 56, 57, and the pressure ring 52. The change in position of the pressure ring 52 alters the effective compressed length of the spring 51 and the pressure applied to the retaining ring 53 into the piston 44. The rotation of the shaft 69 alters the spring-biased pressure on the piston 44 and effects the pressure required to move the piston 44 to open the passages 37, 38.

As shown in FIGURE 1 pads 74 and 75 are cast on the end cover 25 and outer case 10 for connection to a pipe 76, connected to the inlet side of a turbine-pump combination supplying pressure to the system, and an attachment flange 77 is provided on inlet housing 49 for connection to a pipe 78 connected to the delivery side of said combination.

Operation

The inlet pipe 78 is connected to the delivery side of the turbine-pump combination to be controlled, while the outlet pipe 76 is connected to the inlet side of the turbine-pump combination and rod 40 is connected to a valve (not shown) controlling the flow of a gaseous pressure medium driving the turbine-pump combination delivering fluid under pressure to the line.

Fluid at delivery pressure therefore flows into the open end of the member 44 and applies pressure to the inside face of the closed end 45 thereof, the fluid passing through ports 48 into, but being trapped in, the space between lands 46 and 47.

If the force produced by the pressure acting on the end of sensing piston and control valve is that for which the spring 51 has been initially loaded, the lands 46 and 47 on the valve will be positioned to close both passages 37 and 38 and therefore there will be no movement of the actuator piston 34 and rod 40. If the delivery pressure falls temporarily below the predetermined pressure the spring 51 acting through plate 53 will move the valve to the right as seen in FIG. 1, and move land 47 from a position closing passages 38, fluid will then flow through the ports 48 into the working space 38b on the left of the piston 34 and force the piston to the right together with actuator rod 40, which is connected to a butterfly valve (not shown) controlling the flow of gas driving the pump to increase its opening, and therefore the rate of revolution of the pump to increase its delivery until the pressure in the line is sufficient to move the valve to the left to restore the valve to its original position. This movement will cause the actuator to restore the butterfly valve to initial position.

During movement of the piston, due to the admission of high pressure fluid to one working chamber, it will be evident that fluid in the opposite working chamber will be discharged into either end cover 25 through ports 41, or case 10 through the annular space between the inner surface of 43 of the inner end of the actuator 35 and the outer surface of the central portion of member 44 and will flow through outlet pipe 76 to the intake side of the pump. Pipe 76 is of sufficiently large diameter to prevent appreciable back pressure in the device, and intake pipe 78 is as short as possible to avoid fall in pressure due to resistance to flow of fluid during the fluctuations in pressure which may occur.

It will be obvious that should the output of the pump temporarily increase with the result that the pressure in the system rises above the predetermined pressure the action of the device will be similar but in the opposite direction to that described.

It is to be understood that a preferred embodiment of my invention has been specifically described and illustrated by way of example only but various changes therein may be made by those skilled in the art and adapted to the control of other means supplying fluid under pressure than a turbine-pump combination without departing from the scope of the invention as defined by the appended claims.

I claim:

1. A servo control mechanism for a pressure line, comprising: a double ended cylinder; a piston arranged therein; a piston rod on which said piston is mounted, said piston rod being tubular for at least a portion of its length, and passages being provided through the piston rod and piston leading from the inner periphery of the tubular portion of the piston rod to the opposite working faces of the piston; a pressure responsive valve member mounted in the tubular portion of the piston rod, and effective to admit line pressure to one or the other face of said piston through the passages in the piston rod and piston; means for sequentially directing fluid at monitored line pressure through said pressure responsive valve member and then through said passages in a unitary flow path; means for loading said valve member to be operable at a predetermined absolute value comprising only a spring; and means for relieving said pressure responsive valve member of fluid back-pressure.

2. A servo control mechanism for a pressure line, comprising: a double ended cylinder; a piston arranged therein; a piston rod on which said piston is mounted, said piston rod being tubular for at least a portion of its length, and passages being provided through the piston rod and piston leading from the inner periphery of the tubular portion of the piston rod to the opposite working faces of the piston; a motion transmitting operating member formed integrally with said piston and controlling admission of working fluid to a mechanism delivering fluid under pressure to said line; a pressure responsive valve member mounted in the tubular portion of the piston rod, and effective to admit line pressure to one or the other face of said piston through the passages in the piston rod and piston; means for sequentially directing fluid at monitored line pressure through said pressure responsive valve member and then through said passages in a unitary flow path; means for loading said valve member to be operable at a predetermined absolute value comprising only a spring; and means for relieving said pressure responsive valve member of fluid back-pressure.

3. A servo mechanism as set forth in claim 2 and in which said passages lead from the piston rod commencing at points near each end of the piston to the opposite face of the piston.

4. A servo control mechanism for a pressure line, comprising: a double ended cylinder; a piston arranged therein; a piston rod on which said piston is mounted, said piston rod being tubular for at least a portion of its length, and passages being provided through the piston rod and piston leading from the inner periphery of the tubular portion of the piston rod to the working faces of the piston; a pressure responsive tubular valve member mounted for axial movement in said tubular piston rod and having one end open to pressure fluid from the pressure line and the opposite end closed, said tubular valve having port means in its wall alignable with the passages in the piston rod; means for sequentially directing fluid at monitored line pressure through said pressure responsive valve member and then through said passages in a unitary flow path; means for loading said valve member to be operable at a predetermined absolute value comprising only a spring; and means for relieving said pressure responsive valve member of fluid back-pressure.

5. A servo mechanism as set forth in claim 4 and in which said pressure responsive tubular valve member is of an outside diameter less than the inside diameter of the tubular piston rod; a pair of lands closing the space between the outside of the valve and inside of the piston rod and spaced to shut off the passages in the said rod when the valve is in null position; and port means admitting fluid from the interior of said valve member to the space between said lands.

6. A servo control mechanism comprising: an outside case; a double ended cylinder arranged concentrically in said case; an end cap secured to one end of the case; means for leading fluid at line pressure into said end cap; a double acting piston arranged in said double ended cylinder, said piston having an axial bore therethrough and passages leading from said bore to the opposite working faces of the piston, a pressure responsive tubular valve member mounted in the axial bore of the piston and having an open end in communication with the fluid led into said end cap, and a closed end against which the pressure of said fluid acts, and ports in said valve communicating with the passages through said piston to admit fluid from said valve to one or other of the working spaces of the cylinder, and passages between said valve and piston to simultaneously lead fluid from the working space not being supplied with fluid at line pressure into said case and out of the mechanism; means for sequentially directing fluid at monitored line pressure through said pressure responsive valve member and then through said passages in a unitary flow path; means for loading said valve member to be operable at a predetermined absolute value comprising only a spring; and means operated by the movement of the piston.

References Cited in the file of this patent

UNITED STATES PATENTS

| | | |
|---|---|---|
| 840,876 | Steedman | Jan. 8, 1907 |
| 1,600,376 | Trotter | Sept. 21, 1926 |
| 1,601,009 | Trotter | Sept. 28, 1926 |
| 1,732,813 | Kasley | Oct. 22, 1929 |
| 2,462,580 | Watson | Feb. 22, 1949 |
| 2,754,806 | Funston | July 17, 1956 |
| 2,865,335 | Lewis | Dec. 23, 1958 |